United States Patent
McGauley et al.

(10) Patent No.: US 7,634,489 B2
(45) Date of Patent: Dec. 15, 2009

(54) METHODS AND SYSTEMS FOR A NETWORK ELEMENT DATABASE MIGRATION SERVICE

(75) Inventors: Michael P. McGauley, Stoughton, MA (US); Daniel J. Burke, Nottingham, NH (US)

(73) Assignee: Ciena Corporation, Linthicum, MD (US)

( * ) Notice: Subject to any disclaimer, the term of this patent is extended or adjusted under 35 U.S.C. 154(b) by 301 days.

(21) Appl. No.: 11/729,097

(22) Filed: Mar. 28, 2007

(65) Prior Publication Data

US 2008/0243864 A1 Oct. 2, 2008

(51) Int. Cl.
*G06F 17/00* (2006.01)
(52) U.S. Cl. ............... 707/101; 707/102; 707/103 R; 707/104.1
(58) Field of Classification Search ............. 707/1–10, 707/100–104.1, 200–206

See application file for complete search history.

(56) References Cited

U.S. PATENT DOCUMENTS

2006/0026587 A1* 2/2006 Lemarroy et al. ............ 717/170

* cited by examiner

*Primary Examiner*—Isaac M Woo
(74) *Attorney, Agent, or Firm*—Clements Bernard PLLC; Christopher L. Bernard; Tyler S. Brown

(57) ABSTRACT

In various exemplary embodiments, the present invention provides methods and systems of extracting a database from one NE and importing a recreated database into another NE. The database includes NE circuit provisioning data and the like. The present invention is utilized when rolling traffic from one or more NEs to another NE. For example, a decommissioning of one or more older NEs to a new NE can utilize the present invention to migrate the circuit database from the one or more older NEs to the new NE. Advantageously, the present invention verifies that all NE data is extracted and that no data is omitted or duplicated and that the migrated data does not conflict with the new NE's database conventions.

17 Claims, 4 Drawing Sheets

METHODS AND SYSTEMS FOR A NETWORK ELEMENT DATABASE MIGRATION SERVICE

FIELD OF THE INVENTION

The present invention relates generally to telecommunications and data network element (NE) databases. More specifically, the present invention provides methods and systems of migrating circuit provisioning data in a database from a first NE to a second NE which improves the time required, verifies all the entries, and ensures the entries are in the proper format of the second NE's database.

BACKGROUND OF THE INVENTION

Networks, such as telecommunications, data, and the like, include a plurality of different network elements. A network element (NE) is hardware equipment that is addressable and manageable. NEs provide support or services to the user and can be managed through an element manager (EMS). A network (e.g., enterprise or service-provider) can include different NEs from a variety of different equipment vendors. An example of an NE is a multi-service switch (MSS) which includes multi-service interfaces, such as OC-48c/OC-12c/OC-3c ATM and packet-over SONET (POS), ATM interfaces, such as DS-3, E3, OC-3, DS-1, etc., frame relay/IP interfaces, such as OC-3, DS-3, etc., and Ethernet interfaces, such as 10/100 BaseT and gigabit Ethernet. Other examples of NEs include Voice-over-Internet Protocol (VoIP) switches, digital subscriber loop aggregation multiplexers (DSLAMs), optical add-drop multiplexers, and the like.

NEs include various components, such as ingress and egress ports, operations, administration, maintenance, and provisioning (OAM&P) components, and the like. Of note, OAM&P components can include a database which tracks all of the provisioned ports in the NE along with other NE provisioning data. This database includes data relating to all the circuits in the NE, such as circuit name, A-Z connection endpoints, logical port (Lport) identifier, and the like.

Networks often undergo maintenance and upgrades, such as, for example, decommissioning one NE and rolling the traffic to another NE. For example, the decommissioning can occur to remove an older NE of one vendor to roll the traffic to a newer NE from another vendor. The process of decommissioning one NE and rolling the traffic to another typically involves the steps of recreating the database in the new NE, and physically moving cables from the old NE to the new NE during a maintenance period.

Disadvantageously, the process of migrating a database from one NE to another vendor's NE requires intimate knowledge of both management database systems. Current methods of performing this service are a series of Structured Query Language (SQL) commands or scripts that export only the required data and import this into the secondary database system on the new NE to recreate the same level of configuration to allow physical cables to be moved from one NE to another and allow the end user to perform a fiber cutover to decommission one NE. SQL is a popular computer language used to create, retrieve, update and delete data from relational database management systems.

Several challenges exist with the current methods. For example, an NE could potentially have hundreds of thousands of circuits that require replication on the newly commissioned NE. It is difficult to verify that all NE data is gathered and that no circuit data is omitted or duplicated. This is important to avoid dropping a particular circuit during the decommissioning and traffic rolling. Additionally, aggregating multiple systems onto one NE can cause conflicts with circuit names, logical port (lport) identification, Asynchronous Transfer Mode (ATM)/Frame Relay (FR) identifiers, and the like. For example, new NEs typically include significant more circuit capacity than older NEs, and migration can include migrating several older NEs to a single new NE potentially causing data conflicts. Finally, different vendors can have different information in the database which could result in duplicate entries during a migration.

Thus, systems and methods for a database migration service are needed which overcome these limitations described herein.

BRIEF SUMMARY OF THE INVENTION

In various exemplary embodiments, the present invention provides methods and systems of extracting a database from one NE and importing a recreated database into another NE. The database includes NE circuit provisioning data and the like. The present invention is utilized when rolling traffic from one or more NEs to another NE. For example, a decommissioning of one or more older NEs to a new NE can utilize the present invention to migrate the circuit database from the one or more older NEs to the new NE. Advantageously, the present invention verifies that all NE data is extracted and that no data is omitted or duplicated and that the migrated data does not conflict with the new NE's database conventions.

In an exemplary embodiment of the present invention, a network element database migration method includes extracting raw circuit data from a first database, formatting the raw circuit data into one or more data files, filtering the one or more data files to verify that all the network element circuit data is extracted, that no circuit data is omitted or duplicated, that there are no data conflicts, and that there are no duplicate entries, and creating a migration file. The network element database migration method further includes importing the migration file into a second database. The first database includes provisioning data for circuits on a first network element, and the second database includes provisioning data for circuits on a second network element. The extracting step includes using Structured Query Language commands. Alternatively, the first database is configured to output raw circuit data in the extracting step. The one or more data files include comma-delimited files with columns responsive to requirements in the filtering step. Optionally, the formatting step is performed using a spreadsheet. The filtering step is performed by a Perl script input with the one or more data files. Optionally, the one or more data files include columns with data for logical port name, virtual path indicator, and virtual channel indicator, and the filtering step includes concatenating the logical port name, virtual path indicator, and virtual channel indicator columns, sorting the logical port name, virtual path indicator, and virtual channel indicator columns, and comparing each entry in the logical port name, virtual path indicator, and virtual channel indicator columns to ensure no duplicate entries exist. An error file is created with each duplicated entry found in the comparing step.

In another exemplary embodiment of the present invention, a server configured with a network element database migration service includes a processor configured to execute software instructions, an external interface connected to one or more network elements, wherein the network elements include a database of circuit provisioning data, and memory coupled to the processor and the external interface, wherein the memory comprises a database migration tool configured to: extract raw circuit data from one of the database of one of the one or more network elements; format the raw circuit data into one or more data files; filter the one or more data files to verify that all the network element circuit data is extracted, that no circuit data is omitted or duplicated, that there are no data conflicts, and that there are no duplicate entries; and create a migration file. The server includes one of an element management system and a network management system. The external interface includes one of a network interface and an input/output interface. The database migration tool is further configured to load the migration file to a second of the one or more network elements.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention provides methods and systems of extracting a database from one NE and importing a recreated database into another NE. The database includes NE circuit provisioning data and the like. The present invention is utilized when rolling traffic from one or more NEs to another NE. For example, a decommissioning of one or more older NEs to a new NE can utilize the present invention to migrate the circuit database from the one or more older NEs to the new NE. Advantageously, the present invention verifies that all NE data is extracted and that no data is omitted or duplicated and that the migrated data does not conflict with the new NE's database conventions.

Figure 1:
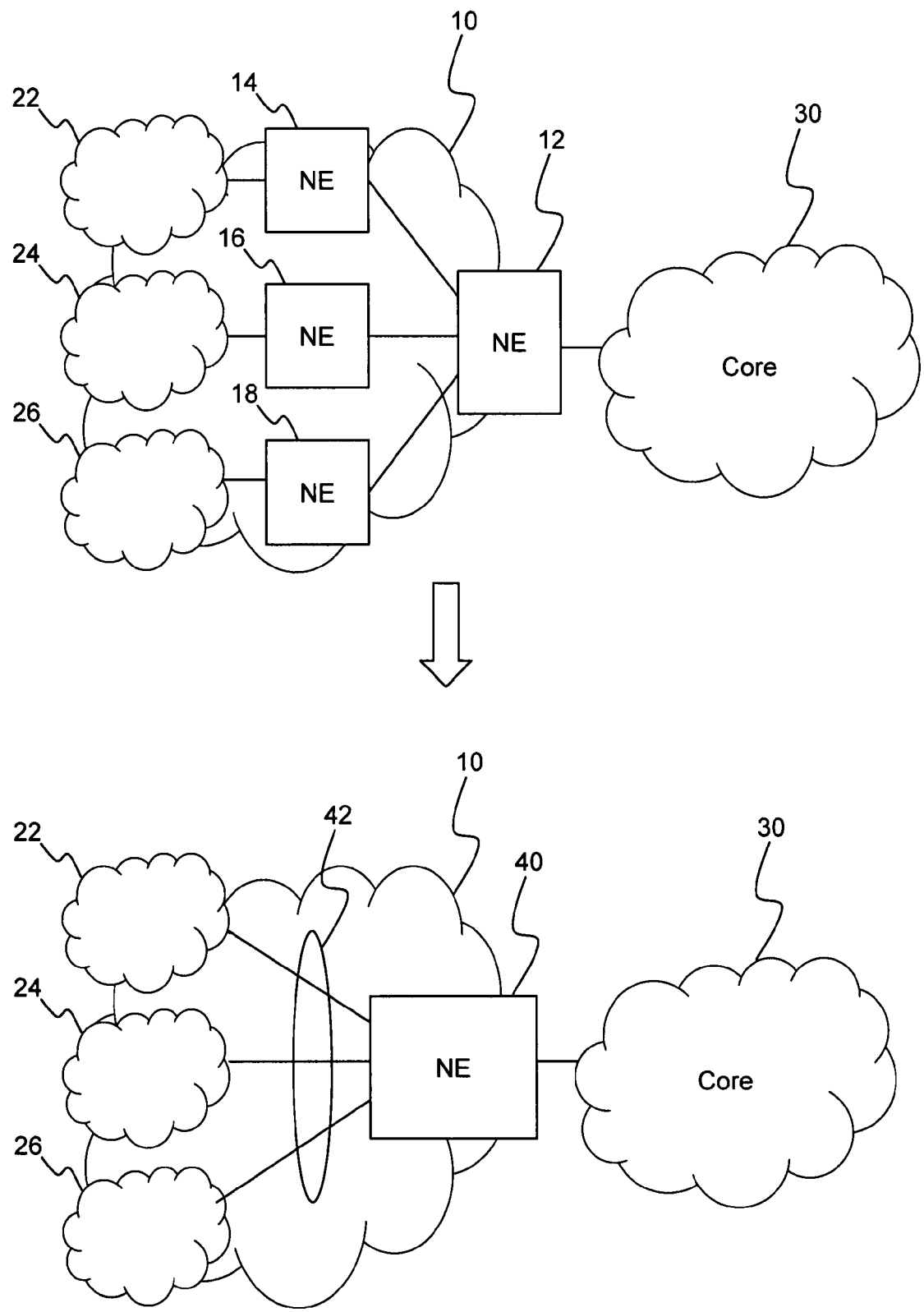
FIG. 1 is an illustration of an exemplary network deployment where multiple NEs are migrated onto one single NE.

Referring to FIG. 1, a multi-service edge network 10 includes NEs 14,16,18 which connect to customers 22,24,26, and an NE 12 which connects to the NEs 14,16,18 and a core 30. The NEs 14,16,18 can include MSSs, switches, routers, DSLAMs, optical add-drop multiplexers, SONET/SDH add-drop multiplexers, and the like with a variety of interfaces such as OC-48c/OC-12c/OC-3c ATM and POS, DS-3, E3, OC-3, DS-1, 10/100 BaseT, gigabit Ethernet, and the like. For example, the customer 22 can be business customers utilizing data services, customer 24 can be residential customers utilizing triple play, and customer 26 can be wireless stations. The NEs 14,16,18 are aggregated by the NE 12 which in turn connects to a core network 30, such as an Internet Protocol/Multi-Protocol Label Switched (IP/MPLS) core. Together, the NEs 12,14,16,18 can be provisioned with thousands (or potentially millions) of circuits to the customers 22,24,26 and the core 30. In an exemplary embodiment, the NEs 12,14,16, 18 can include a Lucent CBX500 (available from Alcatel-Lucent of Murray Hill, N.J.) or a Cisco 6400 (available from Cisco Systems of San Jose, Calif.).

A common procedure in networks, such as the multi-service edge network 10, is to migrate traffic from the NEs 12,14,16,18 to another NE 40. For example, the NE 40 can include newer technology which provides more functionality and higher circuit density such that the NE 40 can replace all the NEs 12,14,16,18. Service providers and other network operators often perform migrations to decommission older NEs to reduce operating expenses or to add new functionality associated with newer NEs. Generally, the process of performing a migration of traffic from the NEs 12,14,16,18 to the NE 40 includes installing the NE 40 with the required ports to service all of the customers 22,24,28, recreating the database in NE 40 to mirror the circuit provisioning data in the NEs 12,14,16,18, and physically rolling the connections from the customers 22,24,28 to a connection 42 to NE 40. The present invention improves the time and accuracy of the recreating step by providing a database migration service which automates and verifies circuit data.

Each of the NEs 12,14,16,18,40 include OAM&P access, such as through an element management system (EMS), network management system (NMS), operations support system (OSS), craft interface, or the like. Operations encompass automatic monitoring of environment, detecting and determining faults and alerting admins. Administration typically involves collecting performance stats, accounting data for the purpose of billing, capacity planning using Usage data and maintaining system reliability. It can also involve maintaining the service databases which are used to determine periodic billing. Maintenance involves upgrades, fixes, new feature enablement, backup and restore and monitoring the media health. The major task is Diagnostics and troubleshooting. Provisioning is the setting up of the User accounts, devices and circuits.

Figure 2:
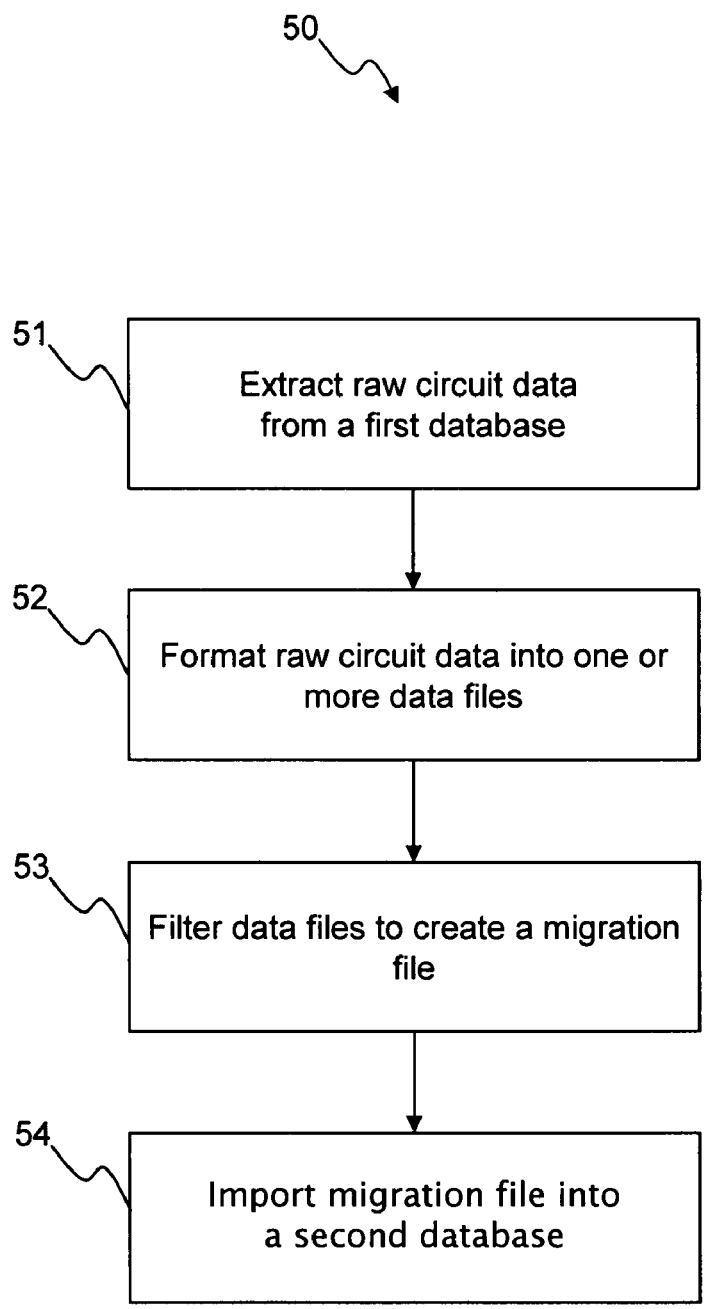
FIG. 2 is a flowchart illustrating an exemplary embodiment of the present invention to extract and filter a database from a first NE to migrate the database to a second NE.

Referring to FIG. 2, a flowchart illustrates an exemplary embodiment of the present invention of a method 50 to extract a database from a first NE and to filter and format the database for migration to a second NE. As described herein, the present invention provides a service to extract a database from a first NE and to import the database into a second NE. In an exemplary embodiment, the present invention provides methods and systems to migrate a database from a Lucent CBX500 or a Cisco 6400 to a CIENA DN7000 (available from CIENA Corp. of Linthicum, Md.). Those of ordinary skill in the art will recognize the present invention can be utilized with any NE which include a database.

First, raw circuit data is extracted from a first database (step 51). The data includes raw data of all the circuit names and endpoints in the first database along with other provisioning data as required (e.g., Lport, identifiers, etc.). The extraction can be done using SQL commands or other scripts. Alternatively, the first database can include a procedure to export all of the circuit data. For example, a Sybase SQL database (available from Sybase, Inc. of Dublin, Calif.) in an NE can have scripts written for it which are operable to create a file containing all the circuit names, endpoints, and other provisioning data.

After extracting the data, the raw circuit data is formatted into one or more data files (step 52). For example, the data could be exported to a comma-delimited file, a text file, or the like. The data files are formatted as required by a filter of the present invention. For example, the filter can require a file with all of the circuits and LportIDs and a file with the LportIDs and the ATM End System Address (AESA). The formatting step can be accomplished through SQL commands that extract specific circuit and naming conventions from the first database at the same time as extracting the data. These commands can be configured to create data files in the format required by the filter. Alternatively, Perl scripts can be utilized to create the data files from the raw circuit data.

Additionally, any other technique can be used to format the raw circuit data as required by the filter.

In an exemplary embodiment, the data files are comma-delimited files ("CSV files") which are created from the raw circuit data. These CSV files include a header in the first line with proper headings as required by the filter followed by lines with the raw data separated by commas according to the headers. CSV files can be edited or created with a spreadsheet program, and further, the CSV file can be sorted with the spreadsheet program, such as Microsoft Excel (available from Microsoft Corp. of Redmond, Wash.). Alternatively, the CSV file can be created by a script or macro which performs a data mining operation on the raw circuit data. Of note, the data files are in a specific format as required by the filter. Those of ordinary skill in the art will recognize that the headers and filter can be modified according to the specifics of the first and second databases, and the use of ATM-specific fields is for illustration purposes.

The data files are filtered to create a migration file (step 53). The filtering verifies the uniqueness of each entry in the data files. For example, the second database can require no duplicate circuit entries during the import portion of the migration. This can be problematic because some vendors do not restrict duplicate entries, and duplicate entries can cause the import to fail. In an exemplary embodiment, the filter concatenates the VPI, LportID, and VCI columns in the data files, then sorts and compares each entry to ensure that there are no duplicate entries. The filter can also remove any discovered duplicate entries, and, for example, include these in another file. The filter can be a script file, such as a Perl script, and it can create a migration file as an output. This output can be a comma-delimited file which includes all of the data from the first database formatting according to the requirements of the second database. Finally, the migration file is imported into a second database (step 54).

The filter can accept multiple inputs such as the one or more data files. Utilizing two or more files allows the filter to ensure accuracy by verifying no circuits are omitted. For example to migrate a database from an ATM NE (e.g., Lucent CBX500 or a Ciscio 6400), there can be three data files including an Lport CSV file, an AESA CSV file, and the raw CSV file. The Lport CSV file includes the logical port names on the first and the second NE and the LportIDs, i.e. a LportID mapping file. The AESA CSV file can include the ATM End System Address and the LportID. Finally, the raw CSV file can include all the provisioning data. These three data files are input into the filter to produce a migration file that can be loaded onto a second ATM or multi-service NE (e.g., CIENA DN7000) to provision all the circuits on the this second NE as required to migrate the first NE. The filter verifies each entry's integrity by comparing the multiple files. Optionally, a user can randomly check several different rows between the initial data files and the migration file to ensure the circuits were mapped correctly.

Figure 3:
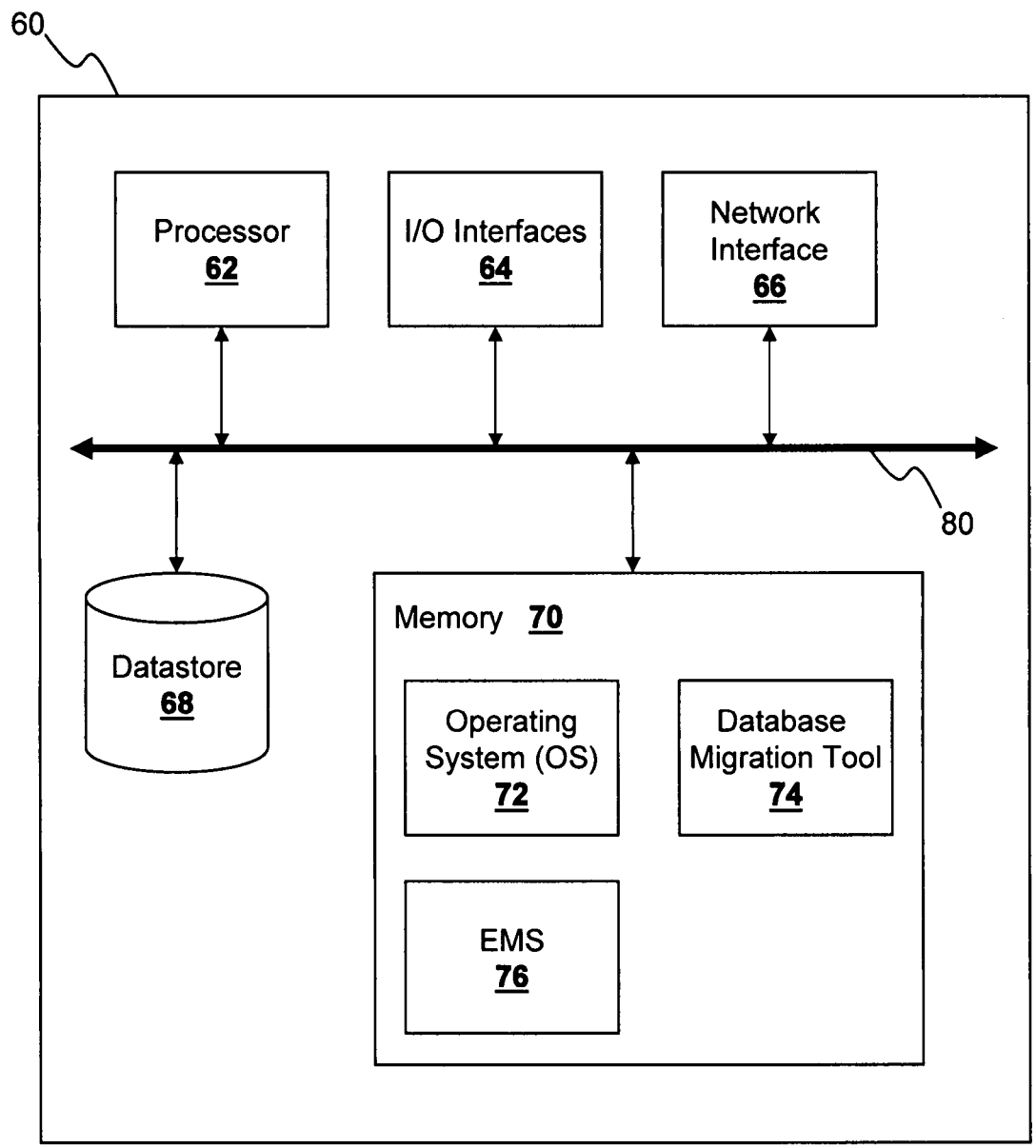
FIG. 3 is a block diagram of a server including a database migration tool according to an exemplary embodiment of the present invention.

Referring to FIG. 3, a block diagram illustrates a server 60 having a database migration tool 74, according to an exemplary embodiment of the present invention. The server 60 can be a digital computer that, in terms of hardware architecture, generally includes a processor 62, input/output (I/O) interfaces 64, network interfaces 66, memory 70, and a data store 68. The components (62, 64, 66, 68, and 70) are communicatively coupled via a local interface 80. The local interface 80 can be, for example but not limited to, one or more buses or other wired or wireless connections, as is known in the art. The local interface 80 can have additional elements, which are omitted for simplicity, such as controllers, buffers (caches), drivers, repeaters, and receivers, among many others, to enable communications. Further, the local interface 80 can include address, control, and/or data connections to enable appropriate communications among the aforementioned components.

The processor 62 is a hardware device for executing software instructions. The processor 62 can be any custom made or commercially available processor, a central processing unit (CPU), an auxiliary processor among several processors associated with the server 60, a semiconductor-based microprocessor (in the form of a microchip or chip set), or generally any device for executing software instructions. When the server 60 is in operation, the processor 62 is configured to execute software stored within the memory 70, to communicate data to and from the memory 70, and to generally control operations of the server 60 pursuant to the software instructions.

The I/O interfaces 64 can be used to receive user input from and/or for providing system output to one or more devices or components. User input can be provided via, for example, a keyboard and/or a mouse. System output can be provided via a display device and a printer (not shown). I/O interfaces 64 can include, for example, a serial port, a parallel port, a small computer system interface (SCSI), an infrared (IR) interface, a radio frequency (RF) interface, and/or a universal serial bus (USB) interface.

The network interfaces 66 can be used to enable the server 60 to communicate on a network. For example, the server 60 can utilize the network interfaces 66 to communicate to NEs. Each NE can include a network interface to communicate to the server for OAM&P. The network interfaces 66 can include, for example, an Ethernet card (e.g., 10BaseT, Fast Ethernet, Gigabit Ethernet) or a wireless local area network (WLAN) card (e.g., 802.11a/b/g). The network interfaces 66 can include address, control, and/or data connections to enable appropriate communications on the network.

A data store 68 can be used to store data, such as information received from NEs. The data store 68 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 68 can incorporate electronic, magnetic, optical, and/or other types of storage media. In one example, the data store 68 can be located internal to the server 60 such as, for example, an internal hard drive connected to the local interface 80 in the server 60. Additionally in another embodiment, the data store can be located external to the server 60 such as, for example, an external hard drive connected to the I/O interfaces 64 (e.g., SCSI or USB connection). Finally in a third embodiment, the data store may be connected to the server 60 through a network, such as, for example, a network attached file server.

The memory 70 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 70 may incorporate electronic, magnetic, optical, and/or other types of storage media. Note that the memory 70 can have a distributed architecture, where various components are situated remotely from one another, but can be accessed by the processor 62.

The software in memory 70 can include one or more software programs, each of which includes an ordered listing of executable instructions for implementing logical functions. In the example of FIG. 3, the software in the memory system 70 includes the database migration tool 74 and a suitable operating system (O/S) 72. The operating system 72 essentially controls the execution of other computer programs, such as the database migration tool 74, and provides scheduling, input-output control, file and data management, memory management, and communication control and related services. The operating system 72 can be any of Windows NT, Windows 2000, Windows XP, Windows Vista (all available from Microsoft, Corp. of Redmond, Wash.), Solaris (available from Sun Microsystems, Inc. of Palo Alto, Calif.), or LINUX (or another UNIX variant) (available from Red Hat of Raleigh, N.C.).

The server 60 can operate as an EMS, NMS, or the like operable to manage NEs in the network. For example, the server 60 can include an EMS program 76 loaded in the memory 70. The EMS program 76 can provide OAM&P access to the NEs. The server 60 can include multiple EMS programs 76 to allow OAM&P access to multiple NE types.

In an exemplary embodiment of the present invention, the database migration tool 74 is loaded on the server 60. The database migration tool 74 can perform data extraction from the first database, filtering of the extracted data, and importing of the filtered data into the second database. For example, the database migration tool 74 can be configured to operate SQL and Perl scripts and the like to extract data and to filter the data. The database migration tool 74 is configured to export and import data from the first database to the second database of a different vendor's NE. The database migration tool 74 utilizes the methods described herein. Advantageously, the database migration tool 74 is configured to verify the uniqueness of potentially thousands or millions of circuits that are migrated. In another embodiment, the database migration tool 74 is only configured to perform the filtering of the data. Here, the server 60 utilizes other functions to extract the data from the first database, such as logging in directly to the first database. Also, the server 60 can utilize other programs, such as a spreadsheet to format CSV files.

Figure 4:
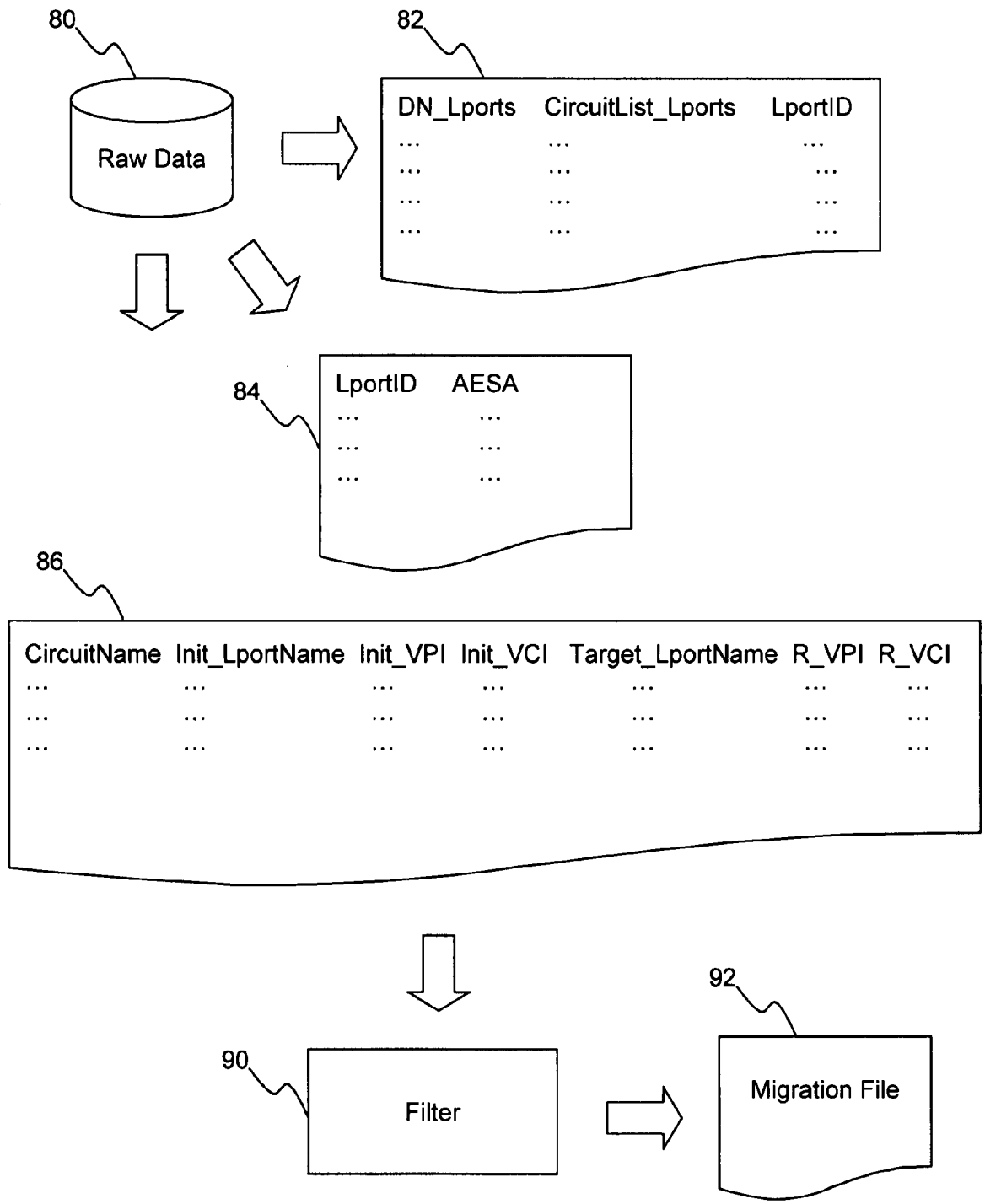
FIG. 4 is a diagram of an exemplary embodiment of the present invention to migrate a database on an ATM NE.

Referring to FIG. 4, an exemplary embodiment of the present invention is illustrated of migrating a database from a first NE (e.g., a Lucent CBX500 NE) to a second NE (e.g., CIENA DN7000 NE). Prior to performing the database migration, the second NE is installed and commissioned with the appropriate ports as required to migrate circuits from the first NE. The first step in the database migration is to get raw data 80 which is all the provisioned circuits in the first NE. Also, the raw data 80 includes data from the second NE, such as the provisioned Lports. There are several ways to get the data 80, such as generating a list from the first NE's EMS, running a script on the first NE's database, or the like. For example, to get the raw data 80 from a CIENA DN7000 a command can be run on the DN7000's command line interface (CLI) such as ">list lport paslot pport lportid name" and the output can be captured.

Three files 82,84,86 are created from the raw data 80, and these files are formatted as require by a filter 90. An LportsName CSV file 82 includes headers listing DN_Lports, circuitList_Lports, and LportID. The DN_Lports column includes the name of each Lport on the new second NE. The circuitList_Lports column contains the name used on the first NE. An AESA CSV file 84 includes a list of each LportID and AESA address. A raw circuit file 86 includes a list of all the circuits on the first NE which are being migrated to the second NE. In an exemplary configuration, the raw circuit file 86 includes headers for circuit name, init_LportName, init_VPI (virtual path indicator), init_VCI (virtual channel identifier), target_LportName, R_VPI (remote VPI), and R_VCI (remote VCI). The LportsName CSV file 82 is a mapping file showing the mapping between the first and second NE. These entries must match the entries in the raw circuit file 86.

The filter 90 program is configured to accept files 82,84,86 as inputs and to provide and output which is properly formatted into a migration file 92 for the second NE. For example, the filter 90 can be a Perl script file called "migratecircuits.pl" and it can be run as: "migratecircuits.pl <LportsName CSV file 82> <AESA CSV file 84> <raw circuit file 86> [<IP Address>]". Here the files 82,84,86 are each input to the migratecircuits.pl filter 90. Optionally, an IP address can be given of the second NE so that the migratecircuits.pl filter 90 can store the migration file 92 there.

As described herein, the functionality of the migratecircuits.pl filter 90 includes verifying that all NE data is gathered, that no circuit data is omitted or duplicated, that there are no conflicts between circuit names, LportID's, ATM/FR identifiers, and the like, and that there are no duplicate entries. The filter 90 is configured to provide an error file or output which lists all the duplicate, conflicts, and omissions, allowing a user to correct these prior to performing the actual migration.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A network element database migration method, comprising:

extracting raw circuit data from a first database;

formatting the raw circuit data into one or more data files comprising columns; filtering the one or more data files to verify that all the network element circuit data is extracted, that no circuit data is omitted or duplicated, that there are no data conflicts, and that there are no duplicate entries, wherein the filtering step comprises the steps of:

concatenating the columns sorting the columns; and comparing each entry in the columns to ensure that no duplicate entries exist; and creating a migration file.

2. The network element database migration method of claim 1, further comprising importing the migration file into a second database.

3. The network element database migration method of claim 2, wherein the first database comprises provisioning data for circuits on a first network element.

4. The network element database migration method of claim 3, wherein the second database comprises provisioning data for circuits on a second network element.

5. The network element database migration method of claim 1, wherein the extracting step comprises using Structured Query Language commands.

6. The network element database migration method of claim 1, wherein the first database is configured to output raw circuit data.

7. The network element database migration method of claim 1, wherein the one or more data files comprise comma-delimited files with columns responsive to requirements in the filtering step.

8. The network element database migration method of claim 1, wherein the formatting step is performed using a spreadsheet.

9. The network element database migration method of claim 1, wherein the filtering step is performed by a Perl script input with the one or more data files.

10. The network element database migration method of claim 1, wherein the one or more data files comprise columns with data for port name, path indicator, and channel indicator.

11. The network element database migration method of claim 10, wherein the one or more data files comprise columns with data for logical port name, virtual path indicator, and virtual channel indicator.

12. The network element database migration method of claim 1, wherein an error file is created with each duplicated entry found in the comparing step.

13. A server configured with a network element database migration service, comprising:
- a processor configured to execute software instructions;
- an external interface connected to one or more network elements, wherein the network elements comprise a database of circuit provisioning data; and
- memory coupled to the processor and the external interface, wherein the memory comprises a database migration tool configured to:
  - extract raw circuit data from one of the database of one of the one or more network elements;
  - format the raw circuit data into one or more data files comprising columns with data for port name, path indicator, and channel indicator;
  - filter the one or more data files to verify that all the network element circuit data is extracted, that no circuit data is omitted or duplicated, that there are no data conflicts, and that there are no duplicate entries, wherein the filtering step comprises the steps of:
    - concatenating the port name, path indicator, and channel indicator columns;
    - sorting the port name, path indicator, and channel indicator columns; and
    - comparing each entry in the port name, path indicator, and channel indicator columns to ensure that no duplicate entries exist; and
  - create a migration file.

14. The server of claim 13, wherein the server comprises one of an element management system and a network management system.

15. The server of claim 13, wherein the external interface comprises one of a network interface and an input/output interface.

16. The server of claim 13, wherein the database migration tool is further configured to load the migration file to a second of the one or more network elements.

17. A network element database migration method, comprising:
- extracting raw circuit data from a first database;
- formatting the raw circuit data into one or more data files comprising columns with data for logical port name, virtual path indicator, and virtual channel indicator;
- filtering the one or more data files to verify that all the network element circuit data is extracted, that no circuit data is omitted or duplicated, that there are no data conflicts, and that there are no duplicate entries, wherein the filtering step comprises the steps of:
  - concatenating the logical port name, virtual path indicator, and virtual channel indicator columns;
  - sorting the logical port name, virtual path indicator, and virtual channel indicator columns; and
  - comparing each entry in the logical port name, virtual path indicator, and virtual channel indicator columns to ensure that no duplicate entries exist; and
- creating a migration file.

* * * * *